United States Patent Office 3,010,944
Patented Nov. 28, 1961

3,010,944
TERPENE DERIVED ESTER AND POLYMERIC DERIVATIVE THEREOF
Bernard A. Parkin, Jr., and Glen W. Hedrick, Lake City, Fla., assignors to the United States of America as represented by the Secretary of Agriculture
No Drawing. Filed Mar. 24, 1960, Ser. No. 17,439
2 Claims. (Cl. 260—78.3)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to a new polymerizable vinyl ester of a terpene derived acid, and to certain polymeric derivatives thereof. More particularly, the invention relates to vinyl 3(1-methyl-1-hydroxyethyl)pimelate lactone, homopolymers thereof, and copolymers of this vinyl ester with vinyl chloride.

A primary object of the present invention is to provide a novel vinyl ester of a terpene derived acid having utility in the production of polymers. Other objects of the invention are to provide homopolymers of vinyl 3(1-methyl-1-hydroxyethyl)pimelate lactone, and copolymers of this ester with vinyl chloride.

The term "homopolymer" used herein refers to a polymer obtained by polymerization of vinyl 3(1-methyl-1-hydroxyethyl)pimelate lactone alone, and the term "copolymer" refers to a polymer obtained by polymerization of this vinyl ester with another polymerizable compound.

Homoterpenyl methyl ketone, i.e., 3-(1-methyl-1-hydroxyethyl)-6-ketoheptanoic acid lactone, can be readily converted by the well-known Willgerodt reaction to 3-(1-methyl-1-hydroxyethyl)pimelic acid lactone. According to this invention, when the latter compound is converted to a vinyl ester there is obtained a compound having valuable properties for use in the production of a variety of polymeric materials. Vinyl 3-(1-methyl-1-hydroxyethyl)pimelate lactone can be homopolymerized readily by the conventional procedures to produce homopolymers having low softening points. These homopolymers are substantially insoluble in benzene, but are soluble in solvents such as dimethylformamide. On the basis of these properties, the homopolymers of this invention have numerous applications, which will be readily apparent to those skilled in the art. The vinyl ester of the present invention also copolymerizes readily with vinyl chloride to yield copolymers of a variety of compositions. These copolymers can be milled and molded to produce rigid plastics. Lower milling and molding temperatures than those required for processing the conventional poly(vinyl chloride-vinyl acetate) copolymers can be employed.

Vinyl 3(1-methyl-1-hydroxyethyl)pimelate lactone is produced by vinylating 3-(1-methyl-1-hydroxyethyl)pimelic acid lactone. The preferred method is to vinylate with a large stoichiometric excess of vinyl acetate in the presence of a copper resinate polymerization inhibitor and a mercury salt of a strong acid as catalyst, using a conventional vinyl interchange procedure. It is generally preferred to employ about 12 moles of vinyl acetate per mole of the lactone being vinylated, and to carry out the vinylation at about room temperature. After the vinlation reaction is completed, the reaction mixture is processed in the usual way to recover and purify the vinyl ester product. Solvent crystallization techniques are generally preferred for purifying the vinyl ester, since vacuum distillation generally results in considerable loss of product due to polymerization or decomposition.

The vinyl ester of this invention can be catalytically reduced, using a catalyst such as palladium on carbon, to produce the corresponding ethyl ester, i.e., ethyl 3(1-methyl-1-hydroxyethyl)pimelate lactone.

The following examples are given by way of illustration and not by way of limitation of the invention.

EXAMPLE 1

*Vinyl 3(1-methyl-1 - hydroxyethyl)pimelate lactone.*—d,l-3-(1-methyl-1-hydroxyethyl)pimelic acid lactone, prepared from homoterphenyl methyl ketone via the Willgerodt reaction was vinylated in the following manner. One mole of the 3-(1-methyl-1-hydroxyethyl)pimelic acid lactone was placed in a reaction flask with 0.5 g. of copper resinate. Vinyl acetate (12 moles) was distilled into the flask and cooled below 30° C. Mercuric acetate (4.0 g., 0.0126 mole) was added and dissolved by stirring the mixture. Sulfuric acid (0.5 ml., 0.0093 mole) was added dropwise with very vigorous stirring. The flask was swept with nitrogen and allowed to stand at room temperature for three days. Sodium acetate (2 g., 0.024 mole) was added and the mixture was stirred 30 minutes. The excess vinyl acetate and most of the acetic acid formed in the reaction were removed by distillation under reduced pressure. The crude residue was dissolved in ether, then washed with water and exhaustively extracted with saturated sodium bicarbonate solution to remove any unreacted acid. The ether solution was dried over anhydrous sodium sulfate, and then cooled whereupon vinyl 3(1-methyl-1-dydorxyethyl)pimelate lactone crystallized from the solution. The product had a melting point of 47.8–48.6° C. The yield of product was 56%. Distillation of this material, B.P. 149° C./0.2 mm., generally resulted in considerable loss to polymerization or decomposition. The distilled material supercools, and if not seeded may not crystallize.

The vinyl 3(1-methyl-1-hydroxyethyl)pimelate lactone product had a hydrogenation value (g./mole $H_2$) of 227.2 (calcd., 226.26). It was catalytically reduced over 5% palladium on carbon in the usual manner to produce the corresponding ethyl ester, that is ethyl 3(1-methyl-1-hydroxyethyl)pimelate lactone. This ethyl ester was found by infrared analyses to be identical with the ethyl ester produced in 69% yield by direct esterification of 3-(1-methyl-1-hydroxyethyl)pimelic acid lactone with ethanol in the presence of p-toluenesulfonic acid catalyst in benzene or chloroform solution, azeotropically removing water from the reaction mixture. The ethyl ester had the following characteristics: B.P. 122°–124° C./0.25 mm.; $n_D^{25}$, 1.4527; molecular weight, calcd. 228.28, found 232 (by determination of saponification equivalent).

EXAMPLE 2

*Homopolymerization of vinyl 3(1-methyl-1-hydroxylethyl)pimelate lacetone.*—A homopolymer was made from freshly purified vinyl 3(1-methyl-1-hydroxyethyl)pimelate lactone, M.P. 47°–47.5° C., according to the following procedure: 5 g. of the vinyl ester, 10 ml. of water, 0.5 g. of Triton X–301 (a commercial sodium alkyl aryl polyether sulfate), 2 ml. of a 2.5% by weight aqueous solution of potassium persulfate, and a drop of Hooker's lauryl mercaptan were charged into a 2-oz. polymerization bottle. The bottle was flushed with nitrogen, sealed with a cap containing a rubber gasket and then tumbled end-over-end in a 50° C. constant temperature bath for 48 hours. The resulting polymer latex was coagulated in the usual way with sodium chloride-sulfuric acid-water coagulated solution. The coagulated polymer was then dissolved in dimethylformamide and precipitated by pouring the solution into methanol. The polymer was separated and freeze-dried under vacuum to give the final homopolymer product.

The conversion was 50% and the homopolymer had a capillary softening range of 87°–100° C., and an inherent viscosity of 0.42 in dimethylformamide (0.25 g. homopolymer per 100 ml. solvent at 25° C.). The homopolymer contained 63.48% C and 8.11% H; and calcd. for $C_{12}H_{18}O_4$: C, 63.70 and H 8.02%.

EXAMPLE 3

*Copolymer of vinyl 3(1-methyl-1-hydroxyethyl-pimelate lactone with vinyl chloride.*—Vinyl 3(1-methyl-1-hydroxyethyl)pimelate lactone was found to copolymerize readily with vinyl chloride to produce copolymers of a variety of compositions. The general procedure used for making the copolymers was as follows: A polymerization bottle was charged with the desired weight of the vinyl ester monomer, water (20 ml.), Triton X–301 (a commercial sodium alkyl aryl polyether sulfate (2.5 g.), potassium persulfate solution (2 ml. of 2.5% solution) and a drop of Hooker's lauryl mercaptan. The bottle was flushed out with nitrogen and cooled in a Dry Ice-acetone bath. Then an excess of liquid vinyl chloride was added and the bottle allowed to warm up so vinyl chloride distilled out of the bottle until the desired weight remained. The bottle was then tightly capped and after it had warmed up to room temperature was placed in a 45° C. bath and tumbled end-over-end for the time noted in Table I below. The bottle was then removed, cooled and opened. The latex was coagulated with salt-sulfuric acid solution. The polymer was collected, washed well with water, methanol and ether, and then dissolved in tetrahydrofuran to give about a 10% solution. This solution was then poured into excess methanol which was stirred in a mechanical blender. The polymer was collected on a filter, washed with methanol, and dried for two days under reduced pressure. When polymer samples were prepared for evaluation of their mechanical characteristics, several bottles were charged and polymerized at one time and the contents combined and worked up together. The results of some copolymerization experiments are given in Table I.

*Table 1*

COPOLYMERIZATION OF VINYL 3(1-METHYL-1-HYDROXYETHYL)PIMELATE LACTONE WITH VINYL CHLORIDE

| Experiment No. | Vinyl ester g. | Vinyl Chloride, g. | Polymerization time, hrs. | Conversion, percent | Softening range, ° C. | Inherent viscosity [a] | Chlorine Content, percent | Ester incorporation, percent |
|---|---|---|---|---|---|---|---|---|
| 1 | 4 | 16 | 88 | 87 | 125–145 | 0.65 | 47.23 | 16.8 |
| 2 | 6 | 14 | 88 | 87 | 125–145 | 0.66 | 41.93 | 26.1 |

[a] Measured at a concentration of 0.25 g. of polymer in 100 ml. of tetrahydrofuran at 25° C.

The copolymer from experiment 2 (Table I) was tested for mechanical characteristics, using standard test procedures. ASTM tests 638–52T were employed to determine all characteristics except the torsional flex temperature ($T_f$) which was determined by ASTM test 1043–51. The following test data were obtained for the copolymer: milling temperature, 250° C.; molding temperature, 260° C.; yield point, 7,760 p.s.i.; modulus of elasticity, 181,000; tensile strength at break (original cross section), 5,370 p.s.i.; elongation, 100%; $T_f$, +59° C.

We claim:
1. Vinyl 3(1-methyl-1-hydroxyethyl)pimelate lactone.
2. A copolymer of vinyl 3(1-methyl-1-hydroxyethyl) pimelate lactone and vinyl chloride in which the proportions of comonomers are about from 1 part by weight of lactone to about from 2 to 4 parts by weight of vinyl chloride.

References Cited in the file of this patent

UNITED STATES PATENTS 2,945,012   Berens _____ July 12, 1960

OTHER REFERENCES

Loeblich: Ind. & Eng. Chem., vol. 47, #4, pp. 855–858.